A. KORGAN.
AUTOWAGON.
APPLICATION FILED OCT. 29, 1917.
1,322,192.
Patented Nov. 18, 1919.
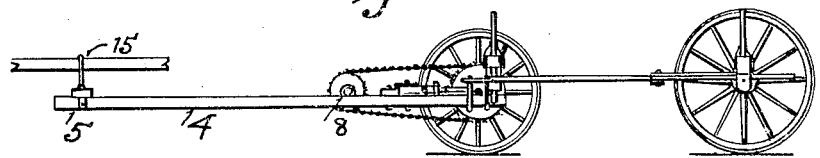
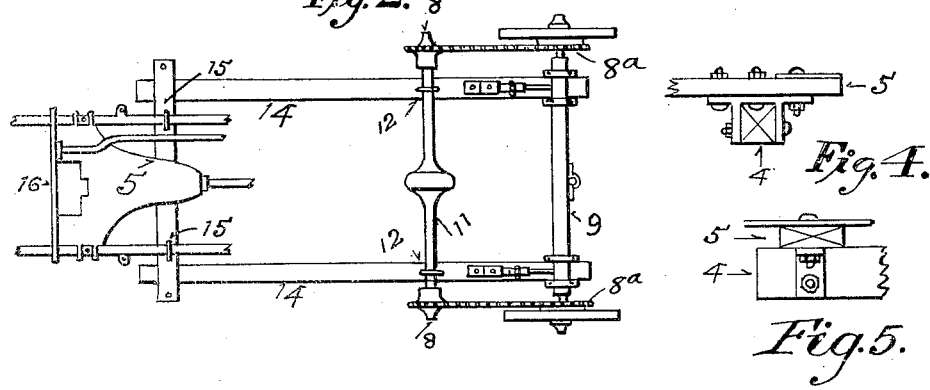
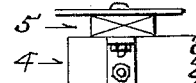
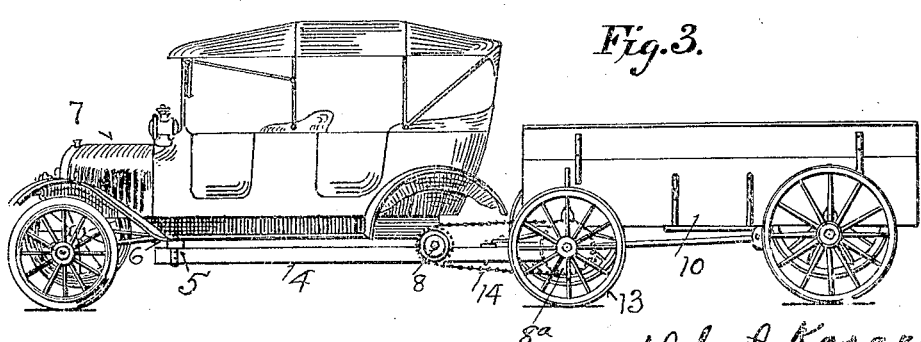
Albert Korgan
INVENTOR.
BY George Bacon
ATTORNEY.
WITNESSES:
John Epperson
Louis R Conboy

UNITED STATES PATENT OFFICE.

ALBERT KORGAN, OF LEWIS TOWNSHIP, POTTAWATTAMIE COUNTY, IOWA.

AUTOWAGON.

1,322,192.     Specification of Letters Patent.     Patented Nov. 18, 1919.

Application filed October 29, 1917. Serial No. 199,100.

*To all whom it may concern:*

Be it known that I, ALBERT KORGAN, of Lewis township, in the county of Pottawattamie and State of Iowa, have invented certain new and useful Improvements in Autowagons; and I do hereby declare the following to be a clear, full, and exact description of the invention, such as will enable others skilled in the art to which it appertains to make and use the same, reference being had to the accompanying drawings, which form a part of this specification.

My invention relates to tractors and more particularly to means which may be applied to vehicles and particularly to automobiles to provide tractors which may be used for hauling trucks or other like vehicles.

The object of the invention is to provide means whereby an automobile may be converted into a tractor for hauling trucks or wagons, and readily restored to its original function whereby an automobile may be used for either pleasure or for business.

Another object is to provide a frame attachment for trucks that may be used to couple the truck with a conventional automobile.

Another object is to provide an improved running gear for trucks and wagons to enable the same to be coupled up with an ordinary automobile and convert the same into a tractor.

With these and other objects in view, my invention consists in certain novel features of construction, arrangement of combinations of parts as will be hereinafter fully described, and pointed out in the claim, reference being had to the accompanying drawings in which, Figure 1 is a side view of the running gear of a truck with my improvements attached thereto.

Fig. 2 is a top plan view of the automobile frame attached to the wagon axle.

Fig. 3 is a side view of an automobile and wagon coupled together in accordance with my invention.

Fig. 4 is a fragmentary side view showing attachment of one side bar to front cross bar.

Fig. 5 is a fragmentary front elevation of the same.

As before stated one object of my invention is to enable a wagon or truck to be coupled up with an ordinary automobile whereby the same may act as a tractor, and this is done by removing the rear wheels of the automobile and supporting the body thereof in rear of the front wheels, by beams attached by clamps to a cross bar, said cross bar being held in place by clamp bolts over the frame and lying beneath the running board of the automobile, as seen in Fig. 4, said beams being extended under the rear axle of the automobile, and under the front axle of the wagon, and firmly held thereto by clamp bolts over the front axle of the wagon, said automobile rear axle and its housing being firmly held on said beams by clamp bolts through said beams and over said housing.

Referring more particularly to the drawing, 4 designates beams clamped at their rear ends to the front axle 9 of the wagon 10, the front ends being connected by the cross bar 5 by means of clips and bolts as shown in Figs. 4 and 5.

Sprocket wheels 8 are fitted on the rear axle of the automobile, the rear wheels of which have been removed; such sprocket wheels are fitted with the hub fitted to occupy the space of the removed auto wheels, and are held in place by keys and nuts.

Sprocket wheels 8ª are secured to the spokes of the front wheels of the wagon 13 carried on the axle 9, the said sprocket wheels being preferably five and eighteen inches in diameter respectively. Sprocket chains 14 are used to connect the sprocket wheels.

The beams 4 are secured to bar 5 and under the same, as shown in Figs. 4 and 5 and are held in stirrups bolted and held in place by bolts through both 4 and 5 leaving space to make the frame flexible to avoid strain from uneven surfaces.

The cross bar 5 is supported by bolt clamps 15 over the automobile frame as shown in Figs. 1 and 2. The rear axle 11 of the automobile is held in place by clamp bolts 12 passing over the housing thereof.

The steel axle 9 of the wagon 10 is held thereto by clamp bolts.

6 is the frame of the automobile mounted on front wheels.

The wagon box 10 is mounted on bolsters held in place by a kingbolt shown in Fig. 2.

By means of my improvements one is enabled to convert an ordinary pleasure car into a motor truck and change can be quickly made from one to the other.

Furthermore with improvements hereinbefore set forth a six wheeled motor truck is obtained.

I am aware that other devices have been applied to automobile structures to utilize their power, and therefore do not claim such combination broadly.

I claim:—

The combination in an autowagon with an automobile chassis, of a frame including a cross bar and side bars, said cross bar supported on and secured to the said chassis by clamp bolts, stirrups supported on said cross bar, an automobile axle mounted on said frame and secured thereon by clamp bolts, the rear end of said frame secured to the front axle of the autowagon, traction wheels carried by said axle, sprocket wheels mounted on the rear axle of the automobile and the front axle of the autowagon, and sprocket chains connecting the sprocket wheels on the said rear and front axles, respectively, and for the purposes set forth.

In testimony whereof I affix my signature in presence of two witnesses.

ALBERT KORGAN.

Witnesses:
E. H. SPETMAN,
THO. LACKOWSKI.